US005101088A

United States Patent [19]

[11] Patent Number: 5,101,088

[45] Date of Patent: Mar. 31, 1992

Andersson et al.

[54] TORCH FOR PLASMA CUTTING AND WELDING, INCLUDING MEANS FOR CENTERING AND CLAMPING THE ELECTRODE

[75] Inventors: Jan-Eric Andersson, Lund; Hamid Shojai, Malmö, both of Sweden

[73] Assignee: S P T Plasmateknik Aktiebolag, Eslov, Sweden

[21] Appl. No.: 457,715

[22] PCT Filed: Jul. 15, 1988

[86] PCT No.: PCT/SE88/00382

§ 371 Date: Feb. 22, 1990

§ 102(e) Date: Feb. 22, 1990

[87] PCT Pub. No.: WO89/00476

PCT Pub. Date: Jan. 26, 1989

[30] Foreign Application Priority Data

Jul. 16, 1987 [SE] Sweden ............................ 8702886-6

[51] Int. Cl.[5] ................................................ B23K 9/00

[52] U.S. Cl. .......................... 219/121.45; 219/121.52; 219/121.51; 219/121.5; 219/75

[58] Field of Search ........... 219/121.5, 121.45, 121.51, 219/121.52, 121.48, 75, 121.44; 313/231.21, 231.31, 231.41

[56] References Cited

U.S. PATENT DOCUMENTS 3,294,953 12/1966 Spies .............................. 219/121.36
3,562,486 2/1971 Hatch .............................. 219/121.5
3,794,806 2/1974 Klasson .......................... 219/121.52
3,813,510 5/1974 Hatch ............................ 219/121.52
4,517,437 5/1985 Yerushalmy et al. ............ 219/121.5
4,581,516 4/1986 Hatch .............................. 219/121.5
4,769,524 9/1988 Hardwick ........................ 219/121.52
4,877,937 10/1989 Muller ............................ 219/121.52

FOREIGN PATENT DOCUMENTS 2144872 9/1972 Fed. Rep. of Germany .
376859 6/1975 Sweden .
447461 11/1986 Sweden .

*Primary Examiner*—M. H. Paschall
*Attorney, Agent, or Firm*—Oblon, Spivak, McClelland, Maier & Neustadt

[57] ABSTRACT

A torch for plasma cutting and welding which includes an outwardly insulated metal casing (10, 11, 12) provided with a non-melting electrode centered therein and having an insert (36) of active material directly opposite a nozzle orifice (17) in one end of the casing. The electrode (31) is centered in the casing by an insulating ring (21) at the electrode tip adjacent said orifice (17), and by an adapter sleeve (34) arranged in the opposite end and having a spring member (40). The adapter sleeve (34) has a tapered opening for receiving the likewise tapered end (33) of the electrode (31) and is axially slotted (35) to expand radially when receiving the electrode (31), so as to engage with the interior of the casing for safe current supply form the casing to the electrode (31). Gas is supplied from an inlet (27) along the electrode (31) and is forced to pass inclined ducts (41) in the electrode (31) in the area of the insulating ring (21), so as to be conducted in a spiral motion adjacent the orifice (17). The torch can be cooled with water or air.

10 Claims, 2 Drawing Sheets

TORCH FOR PLASMA CUTTING AND WELDING, INCLUDING MEANS FOR CENTERING AND CLAMPING THE ELECTRODE

TECHNICAL FIELD

The present invention relates to a torch for plasma cutting and welding, comprising a tubular casing of which one end is provided with a nozzle having an orifice, a nonmelting electrode which is centered such in the casing that its one end is located directly opposite the orifice, a gas duct extending from a gas inlet connectable to a gas source, past the electrode and to the orifice, and an electrode terminal connectable to a power source.

BACKGROUND ART

For some twenty years, the extremely high heat energy of an ionized gas flow has been used for cutting and welding metals, spraying powder compositions etc. When this technique is used for cutting (plasma cutting), the cutting speed can be increased and the range of cutting applications can be extended, compared to conventional gas cutting. In welding, highly reliable joints are obtained, since the method is far less susceptible to variations during welding (varying distances to the workpiece) than other welding methods. In plasma welding, the heating zone in the workpiece is reduced, and the method is also electricity-saving. Since the method came into industrial use, the torches have not changed to any appreciable extent. Thus, the nonmelting electrode connected to the negative pole of a current source and centered in a casing is passed by a gas which then escapes through an orifice at the electrode tip in which it is ionized by the arc generated between the electrode and the workpiece connected to the positive pole of the power source. Through the years, the material of the electrode has however developed according to the character of the plasma generating gas (oxidizing, inert or reducing), and now the electrode frequently consists of a copper holder having an insert of an active material in the arc generation area. Different ways of fixing and centering the electrode as well as different cooling methods, have been used.

DISCLOSURE OF THE INVENTION

The object of the present invention is, while maintaining the original concept, to improve the design of the electrode and its fixation in the casing and, in this context, to reduce the risk of accidents and to provide an improved gas conduit in the casing. This object is achieved by means of the structure which is defined in detail in the characterizing clauses of the appended claims.

A plasma cutting torch will now be described, since this embodiment is the easiest application of the invention, but it will be appreciated that the inventive concept is applicable also to plasma welding units and spraying units.

BRIEF DESCRIPTION OF THE DRAWINGS

The invention will now be described in detail with reference to the accompanying drawings in which a preferred embodiment of the invention is shown schematically.

BEST MODE FOR CARRYING OUT THE INVENTION

Figure 1:
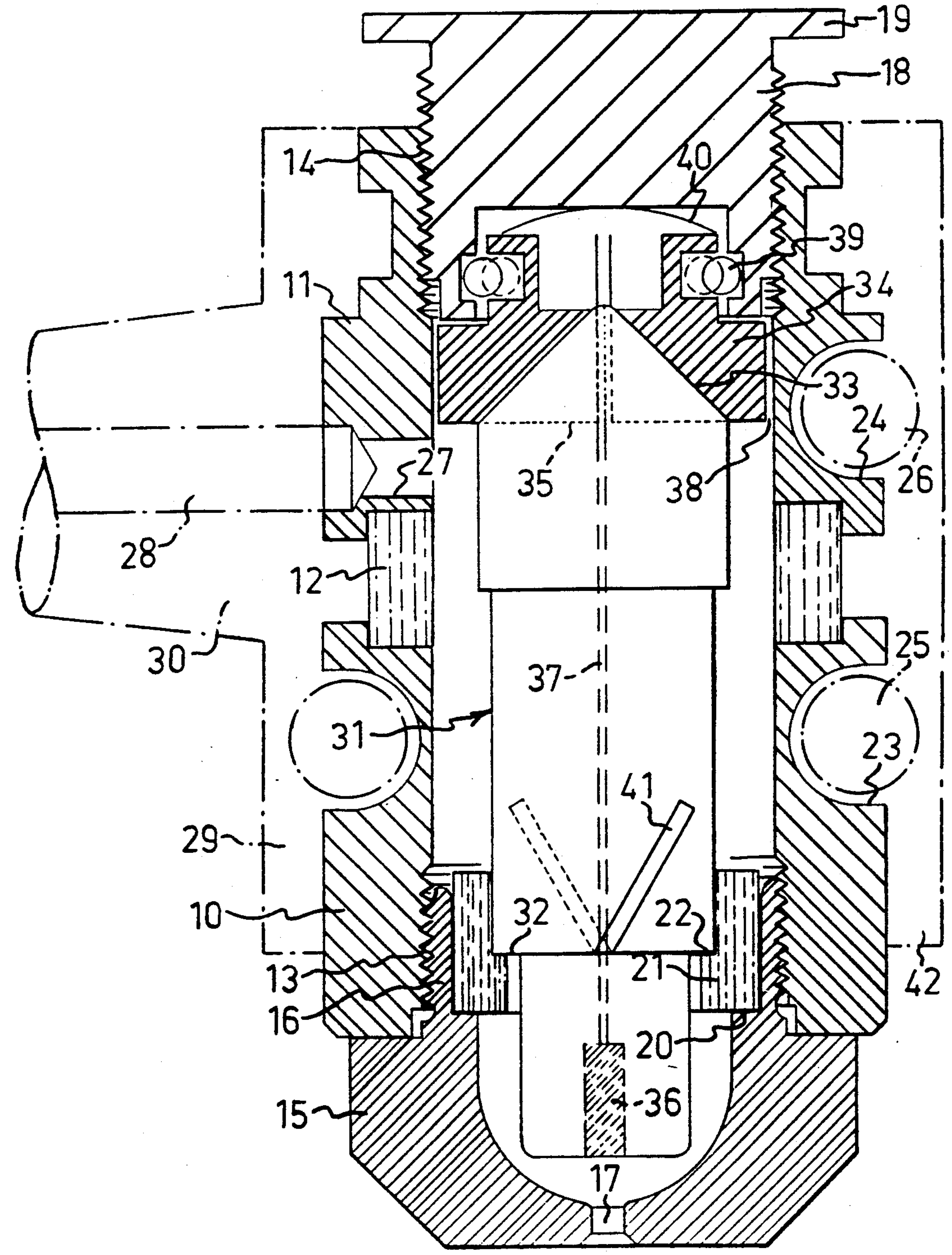
FIG. 1 is an axial section of a torch adapted for liquid cooling.

The drawing illustrates a torch connected to a power unit and a gas source which are not shown since they can be of conventional design. A handle 30 is integrated with the torch and passes into a hose which holds all the conduits which are necessary for the torch. The torch comprises a casing having a front body 10, a rear body 11 and an intermediate insulator 12 disposed therebetween. The insulator 12 accurately fits into the bodies 10, 11 disposed on both sides thereof, and all parts are held together by an outer plastic cover 29 which will be described in detail below. As will appear from the drawing, the front body 10 is tubular, and its one end is provided with an internal thread 13. In its opposite end, the body 10 is formed with a groove for receiving one end of the intermediate insulator 12. The rear body 11 is formed with a matching groove for receiving the intermediate insulator in its end facing the front body. In its opposite end, the rear body 11 has an internal thread 14. A nozzle 15 of conventional design is screwable into the front body by means of a flange 16 which is of annular cross-section and has an external thread engaging with the thread 13 of the front body. The nozzle has an orifice 17 aligned with the longitudinal center line of the casing 10, 11, 12. An electrode cap 18 is screwable into the outwardly facing end of the rear body by means of an external thread engaging with the internal thread 14 of the rear body 11. To facilitate fastening of the electrode cap, its outwardly facing end is formed with a knurled circumferential fingergrip portion 19.

Directly opposite the annular flange 16, the nozzle 15 has an annular recess which is open towards the interior of the torch and which terminates in a shoulder 20 also facing the interior of the torch. An annular insulating body 21 is disposed in this recess and engages with the shoulder 20. The insulating body 21 has a corresponding recess open towards the interior of the torch and formed with an abutment surface 22. The front body 10 has an external groove 23 of approximately semicircular cross-section in which an annular cooling duct 25 for liquid is received, and the rear body has a corresponding groove 24 in which a cooling duct 26 is received. A gas inlet 27 opens in the space defined by the front body 10, the rear body 11 and the intermediate insulator 12. The cooling ducts 25, 26 and the gas inlet 27 communicate, in a manner not shown, with conduits arranged in the handle 30 and indicated at 28. As will appear from the above, the handle 30 is made of plastic in one piece with a cover 29 enclosing the front body 10, the rear body 11 and the intermediate insulator 12. The current conductor to the electrode can be designed as a separate conductor inside or outside one of the cooling ducts 25, 26, but consists in this case of the jacket of the cooling duct 26 which is connected with the rear body 11 to be connected to the electrode 31, as will be explained in detail below.

As is common practice, the electrode 31 comprises a copper body whose exterior can be nickel-plated. The electrode 31 is of uniform thickness from its end adjacent the orifice 17 up to a shoulder 32 where it becomes thicker. When the electrode 31 is mounted in the casing 10, 11, 12, the shoulder 32 abuts against the shoulder 22 of the insulator 21. At a distance from the shoulder 32, the electrode 31 becomes thicker again and finally terminates in a tapered upper end 33 which is received in a correspondingly tapered recess in a cylindrical adapter sleeve 34 with a tapered end portion facing away from the interior of the torch. The adapter sleeve 34 is formed with axial slots as indicated at 35, which allows the sleeve 34 to expand radially when the adapter sleeve 34 and the electrode 31 are axially compressed by means of the electrode cap 18. The radial expansion urges the adapter sleeve 34 against the inside of the rear body 11 and eliminates the slot shown at 38 in the drawing, whereby the adapter sleeve 34 comes into close contact with the rear body 11, such that the current conductor connected to the rear body 11 is connected to the electrode 31 via the adapter sleeve 34 with a minimum of resistance. The adapter sleeve 34 is connected with the electrode cap 18 via an annular spring 39 which is mounted in a groove in the outwardly facing surface of the tapered portion of the adapter sleeve 34 and a corresponding groove in the electrode cap. The adapter sleeve 34 engages with the electrode cap by means of a cup spring 40. During operation of the torch, the electrode 31 thus can expand axially without damaging the casing 10, 11, 12 and its associated parts.

The gas supplied enters the torch from the conduit 28 via the inlet 27 and flows along the space between the electrode and the casing 10, 11, 12 down to the insulator 21 ending off the space. Here, the gas is forced into ducts 41 which are formed in the circumference of the electrode 31 and inclined relative to the axial direction of the electrode. In this manner, the gas can pass the insulator 21 and enter the space around the electrode tip facing the orifice 17 in a spiral motion, and from this space the gas can escape through the orifice 17 as a concentrated jet. This gives a gas concentration which has been unobtainable in prior art torches. The ducts 41 in the electrode surface, which are preferred from the viewpoint of manufacture, may, of course, be replaced by bores formed in the electrode proper and opening into the area of the nozzle, and it is also possible to substitute, for the ducts 41 in the electrode, ducts that are formed in the insulator 21.

In the drawing, two ducts 41 are shown, but preferably four ducts are arranged and, if required, further ducts can of course be formed in the circumference of the electrode 31.

In the torch according to the invention, the gas is conducted to the orifice 17 of the nozzle 15 in a highly advantageous manner, which yields a more efficacious plasma jet than could be obtained by prior art technique. Because of the arrangement of the nozzle with the shoulder 20, and the insulator 21 with the shoulder 22, and because the electrode 31 is connected to the power unit via the tapered portion of the electrode and the tapered opening, the electrode will automatically fall out of the torch when the nozzle 15 is screwed out of the front body 10, so that the operator is safely protected against accidental contact with an electrode 31 still bearing current. As has been explained above, the connection of the adapter sleeve 34 with the electrode cup 18 via the cup spring 4 readily allows the electrode to expand in the longitudinal direction.

Figure 2:
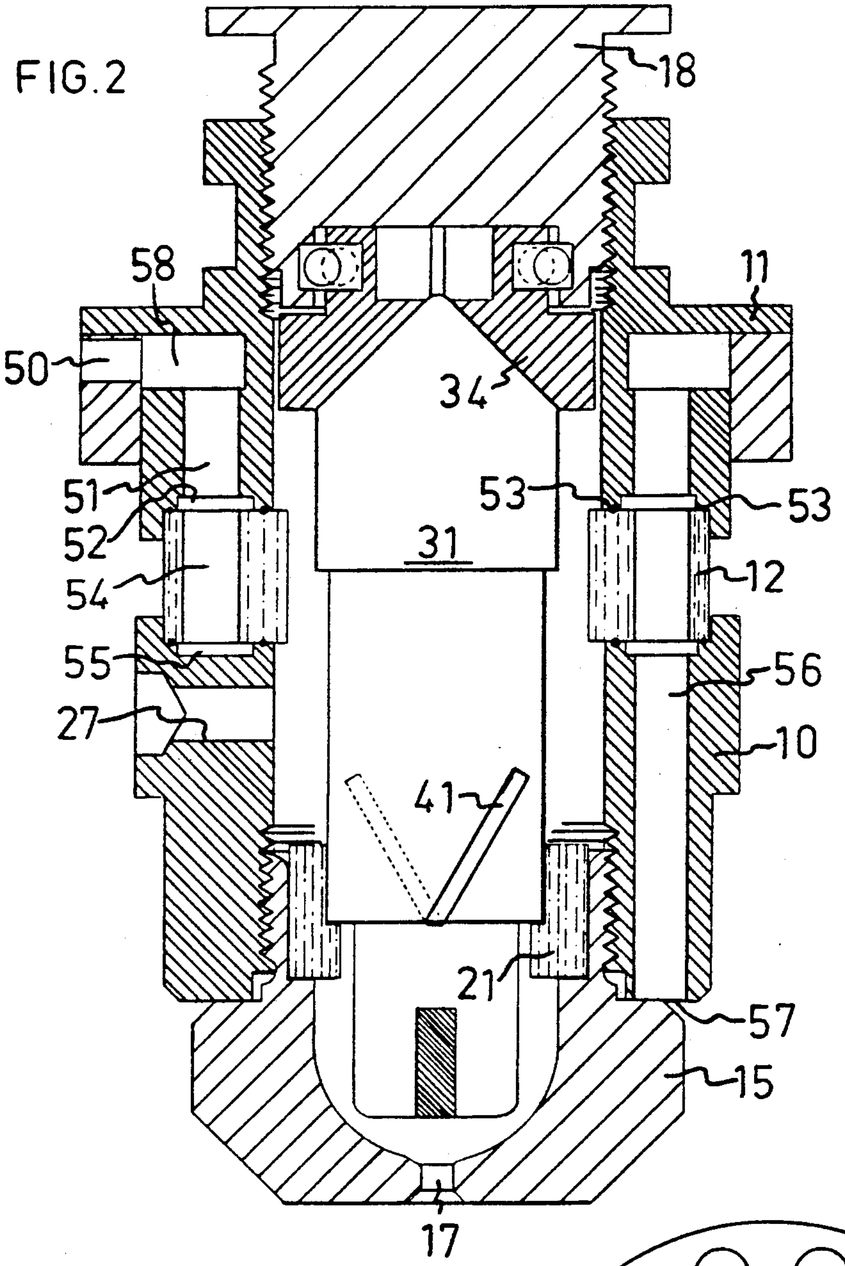
FIG. 2 is an identical view of the torch, but modified for air cooling.
Figure 3:
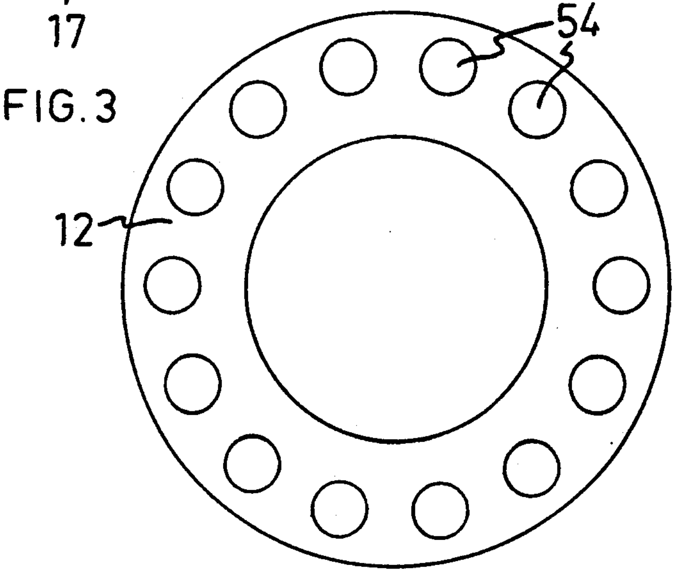
FIG. 3 illustrates an intermediate insulator for the torch shown in FIG. 2.

FIG. 2 shows an embodiment of the torch modified for air cooling, in which the parts already shown in FIG. 1 are identified by like reference numerals. In the casing comprising the front body 10, the rear body 11 and the intermediate insulator 12, a number of ducts extend in parallel with the electrode 31 over the major part of the length of the electrode, and compressed air is conducted through said ducts for cooling the casing and the electrode. The air is supplied via an inlet 50 which opens into an annular space 58 which extends coaxially with the center axis of the electrode. A number of ducts 51 issue from the space and extend coaxially in the rear body 11 and open into a likewise annular distributing space 52 in the edge surface of the rear body facing the intermediate insulator 12. As in the first embodiment, the intermediate insulator 12 is connected with this edge surface. The intermediate insulator 12 has, in this case, a number of through-holes 54, as shown in FIG. 3. The opposite end of the intermediate insulator 12 is connected with the rearward edge surface of the front body 10, which has an annular collecting space 55 which corresponds to the distributing space 52 and from which axial ducts 56 issue, opening into the edge surface of the front body 10 adjoining the nozzle 15, as indicated at 57. As in the first embodiment, the intermediate insulator 12 accurately fits into the front and rear body edge surfaces facing each other and is held in engagement therewith by means of an outer plastic cover (not shown in FIG. 2) corresponding to the cover 29 in FIG. 1. Sealing means 53 in the form of 0-rings are disposed between the end surfaces of the insulator 12 and the edge surfaces of the bodies 10, 11 facing said end surfaces.

During operation of the torch shown in FIG. 2, cooling air is supplied via the inlet 50, the space 58 and the ducts 51 and enters the distributing space 52, before it is conducted through the insulator 12 to the collecting space 55. The air is then conducted from the collecting space 55 through the ducts 56 in the front body 10 and escapes through the spaces 57 at the ends of the ducts 56 adjoining the nozzle 15, whereby the passing air also cools the nozzle 15.

The number of ducts 51, 56 in the bodies 11, 10 is preferably the same as the number of through-holes 54 in the insulator, but can also be a different number, if required. Air is normally used as the cooling medium in the embodiment shown in FIG. 2, but of course some other gas can also be used. It should be noted that the gas, usually air, entering via the inlet 27 and escaping through the orifice 17 is separated from the air which is used for cooling.

As described above, the invention is applied to a torch for plasma cutting but is, of course, also useful for a plasma welding unit, in which case an electrode feeder is connected to the torch end portion adjacent the orifice 17, for example by screwing the feeder onto an external thread on the front body portion between the end and the edge 42 of the torch plastic cover 29. Such a fusion electrode feeder can be combined with a means for supplying a shielding gas, if required. Further fittings can be connected at this location, e.g. when using a torch according to the invention for melting powder which is supplied for coating purposes.

We claim:

1. A torch for plasma cutting and welding, comprising:

a tubular casing of which one end is provided with a nozzle having an orifice, a nonmelting electrode which is centered in the casing such that one end thereof is located adjacent and directly opposite said orifice, a gas duct extending from an inlet connectable to a gas source, past said electrode and to said orifice, an electrode terminal connectable to a power source, and an annular insulator which centers said electrode in said casing, at the electrode tip adjoining said orifice, and which is disposed in a recess formed in said nozzle and open away from said orifice, wherein said annular insulator has a recess facing away from said orifice and having a boundary surface with which said electrode engages by a shoulder, such that said insulator follows both the inner wall of said nozzle and the electrode circumference;

said gas duct is formed, in the area of said insulator, by at least two ducts extending in said electrode and inclined relative to the axial direction thereof; and the electrode end facing away from said nozzle is kept clamped by said nozzle, against a tapered opening in a current-bearing adapter sleeve in said casing.

2. The torch as claimed in claim 1, wherein said ducts consists of peripheral grooves.

3. The torch as claimed in claim 1 wherein the electrode end facing away from said nozzle is tapered in correspondence with said opening in said adapter sleeve in the casing end facing away from said orifice.

4. The torch as claimed in claim 3 wherein the boundary wall of the adapter sleeve opening is slotted in the axial direction of the opening to enable radial expansion of said sleeve for fastening said electrode.

5. The torch as claimed in claim 4 wherein the casing end facing away from said nozzle is provided with an end cap which is screwable into said casing and between whose end surface facing the interior of said casing and the opposing end surface of the adapter sleeve there is mounted a spring member tensioned by screwing of said cap against said sleeve.

6. The torch as claimed in claim 1, wherein said tubular casing comprises a front body whose front end is provided with an internal thread which engages with an externally threaded annular portion of said nozzle, and whose rear end is formed with a groove for receiving a front end portion of an annular intermediate insulator, and a rear body whose front end is formed with a groove for receiving a rear end portion of said intermediate insulator, and whose rear end has an internal thread for receiving said externally threaded end cap, and that said front body, said intermediate insulator and said rear body are cast into a plastic cover which is integrated with a handle for handling said torch.

7. The torch as claimed in claim 1, wherein said casing is provided with external cooling tubes which are received in grooves in said casing and enclosed by said plastic cover.

8. The torch as claimed in claim 1, wherein said casing is in a wall portion thereof provided with cooling air ducts extending along said electrode and having an inlet adjacent the electrode upper end and an outlet adjacent said nozzle.

9. The torch as claimed in claims 6 or 8, wherein the inlet of said cooling air ducts is arranged in the rear body of said casing, in which said inlet is connected with an annular distributing space, and that said intermediate insulator has a number of through-holes having one end connected with said distributing space and another end connected with a collecting space in said front body, from which the cooling air ducts of said front body issue and open into the front edge surface of said front body.

10. A torch for plasma cutting and welding, which comprises:

a tubular casing having an opening at one end and a current-bearing sleeve having a tapered opening at an opposite end;

a nozzle member removably connected to said opening of said casing;

an insulator mounted within said casing and engaging said nozzle member;

a disposable electrode removably mounted in said casing and having one end engaging with said tapered opening of said sleeve and a second end engaging said insulator so as to be centered within said casing and clamped between said insulator and said tapered opening of said sleeve and removable from said casing upon disconnecting of said nozzle from said casing.

* * * * *